United States Patent [19]

Graf et al.

[11] Patent Number: 5,436,834
[45] Date of Patent: Jul. 25, 1995

[54] TRANSMISSION CONTROL FOR A MOTOR VEHICLE WITH ADAPTATION OF SHIFT POINTS TO DRIVING HABITS OF A DRIVER

[75] Inventors: Friedrich Graf, Regensburg; August Kammerl, Brunn, both of Germany

[73] Assignee: Siemens Aktiengesellschaft, Munich, Germany

[21] Appl. No.: 146,459

[22] Filed: Nov. 2, 1993

Related U.S. Application Data

[63] Continuation of Ser. No. 743,995, Aug. 12, 1991, abandoned.

[30] Foreign Application Priority Data

Aug. 14, 1990 [EP] European Pat. Off. ........... 90115594

[51] Int. Cl.⁶ ...................... B60K 31/00; B60K 20/00
[52] U.S. Cl. ................ 364/424.1; 364/424.01; 477/129; 477/121; 180/335; 180/271
[58] Field of Search ............. 364/424.1, 424.01; 477/129, 70, 121, 908, 167; 439/71; 475/208; 180/335, 271, 336, 33

[56] References Cited

U.S. PATENT DOCUMENTS

| 3,784,247 | 1/1974 | Mills | 364/461 |
|---|---|---|---|
| 3,899,671 | 8/1975 | Stover | 180/336 |
| 3,991,845 | 11/1976 | LaPointe | 180/77 |
| 4,073,208 | 2/1978 | Dick | 74/866 |
| 4,226,295 | 10/1980 | Rembold et al. | 180/335 |
| 4,312,248 | 1/1982 | Sugimoto et al. | 477/70 |
| 4,324,153 | 4/1982 | Sugimoto et al. | 477/129 |
| 4,439,158 | 3/1984 | Weber | 434/71 |
| 4,677,880 | 7/1987 | Hattori et al. | 74/866 |
| 4,789,936 | 12/1988 | Kurihara et al. | 364/424.1 |
| 5,019,799 | 5/1991 | Oshiage et al. | 340/438 |
| 5,036,812 | 8/1991 | Fukui et al. | 123/339 |
| 5,113,721 | 5/1992 | Polly | 74/866 |
| 5,131,292 | 7/1992 | Kodama | 74/862 |
| 5,150,634 | 9/1992 | Wakahara | 74/866 |
| 5,157,609 | 10/1992 | Stehle et al. | 364/424.1 |
| 5,166,879 | 11/1992 | Greene et al. | 364/424.1 |
| 5,247,859 | 9/1993 | Agusa et al. | 364/424.1 |

FOREIGN PATENT DOCUMENTS

| 0120191 | 10/1984 | European Pat. Off. . |
|---|---|---|
| 0142633 | 11/1987 | European Pat. Off. . |
| 3018032 | 11/1981 | Germany . |
| 3539682 | 5/1986 | Germany . |
| 3621674 | 1/1987 | Germany . |
| 2852195 | 8/1987 | Germany . |
| 3341652 | 12/1987 | Germany . |
| 3018033 | 7/1989 | Germany . |
| 2047362 | 11/1980 | United Kingdom . |
| 8605449 | 9/1986 | WIPO . |

*Primary Examiner*—Kevin J. Teska
*Assistant Examiner*—Jacques H. Louis-Jacques
*Attorney, Agent, or Firm*—Herbert L. Lerner; Laurence A. Greenberg

[57] ABSTRACT

In a transmission control for a motor vehicle, the load acting on the motor vehicle, the engine rpm and the engine torque are taken into consideration when determining a point for shifting gears. A circuit determines if the engine torque lies above a first threshold value characterizing a traction operation of a motor vehicle, as a first condition; if an amount of acceleration lies below a second threshold value characterizing unaccelerated drive, as a second condition; and if the engine torque lies above a torque characterizing a movement resistance on a level surface plus a third threshold value, as a third condition. A signal is generated when the first, second and third conditions have been met for displacing the point for shifting gears in a direction of increased output rpm.

13 Claims, 3 Drawing Sheets

TRANSMISSION CONTROL FOR A MOTOR VEHICLE WITH ADAPTATION OF SHIFT POINTS TO DRIVING HABITS OF A DRIVER

This application is a continuation of application Ser. No. 07/743,995, filed Aug. 12, 1991 now abandoned.

BACKGROUND OF THE INVENTION

1. Field of the Invention

The invention relates to a transmission control for a motor vehicle wherein the load acting on the motor vehicle is taken into consideration when determining the point for shifting gears.

During steady driving, i.e. when neither accelerating nor decelerating, this load contains a constant portion based on the resistance to movement (air resistance and friction of rotation) and a changing portion, depending on the upslope or incline of the road.

2. Description of the Related Art

In a known device for the determination of the upslope of the road (disclosed in European Patent No. 0 142 633 B1), the measured values provided by sensors for engine rpm, number of wheel revolutions, position of the gas pedal, etc. are evaluated and the drive torque or rpm torque portions required for overcoming the load portions mentioned above are computed. Other known control configurations for automatic transmissions also displace the shift points of the transmission as a function of drive parameters, in particular of the upslope of the road, actually in accordance with varying computing commands (as disclosed in German Patents DE 28 52 195 C2 and DE 30 18 033 C2).

A device for controlling a clutch-transmission unit adapts itself to the driving habits of the driver and to the prevailing driving or traffic situation (as disclosed in German Patent DE 33 41 652 C2). In order to accomplish that objective, the device receives a plurality of various measurement signals and evaluates them in a complicated way for operating a run-off control.

SUMMARY OF THE INVENTION

It is accordingly an object of the invention to provide a transmission control for a motor vehicle, which overcomes the hereinafore-mentioned disadvantages of the heretofore-known devices of this general type and which adapts the shift points of the transmission to the driving habits of the driver as well as to the load, especially upslopes of the road, at a small expense.

With the foregoing and other objects in view there is provided, in accordance with the invention, an improvement in a transmission control for a motor vehicle wherein a load acting on the motor vehicle, engine rpm and engine torque are taken into consideration when determining a point for shifting gears. The improvement comprises a circuit having means for determining if an engine torque lies above a first threshold value characterizing a traction operation of a motor vehicle, as a first condition, means for determining if an amount of acceleration lies below a second threshold value characterizing unaccelerated drive, as a second condition, and means for determining if an engine torque lies above a torque characterizing a movement resistance on a level surface plus a third threshold value, as a third condition; and means for generating a signal when the first, second and third conditions have been met for displacing a point for shifting gears in a direction of increased output rpm.

In accordance with another feature of the invention, there is provided a mean value generator for averaging the engine rpm or the output rpm in individual gears.

In accordance with a further feature of the invention, there is provided a mean value generator for averaging the engine rpm or the output rpm of all gears.

In accordance with an added feature of the invention, there is provided a comparison circuit having means for comparing the averaged engine rpm or output rpm with an upper threshold value and means for generating a signal if the threshold value is exceeded, for displacing the point for shifting gears in a direction of higher engine drive rpm.

In accordance with a concomitant feature of the invention, there is provided a comparison circuit having means for comparing the averaged engine rpm or output rpm with a lower threshold value, for displacing the point for shifting gears in a direction of reduced engine drive rpm if the averaged engine rpm or the averaged output rpm, respectively, fall below the threshold value.

Other features which are considered as characteristic for the invention are set forth in the appended claims.

Although the invention is illustrated and described herein as embodied in a transmission control for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
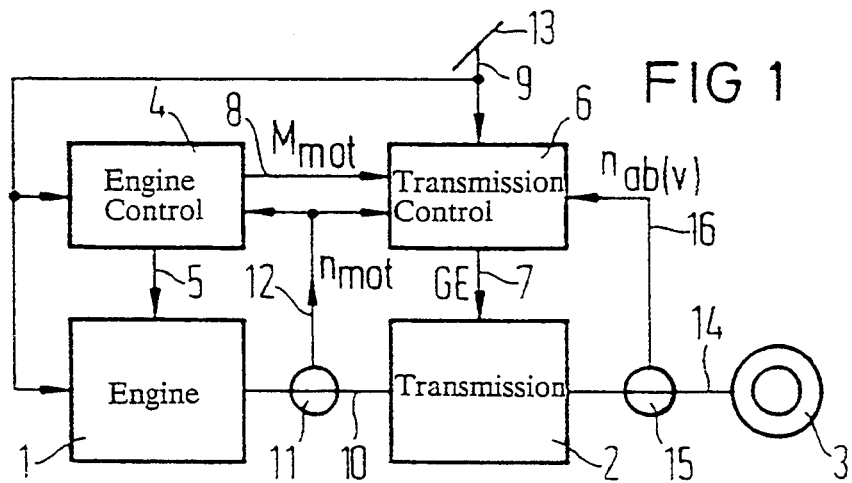
FIG. 1 is a schematic and block circuit diagram showing the most important components of a drive of a motor vehicle, which is provided with a transmission control in accordance with the invention.

Referring now to the figures of the drawing in detail and first, particularly, to FIG. 1 thereof, it is seen that a drive torque provided by an engine 1 is transferred to powered or drive wheels of a motor vehicle, of which only one wheel 3 is shown in the drawings, by means of an automatic transmission 2. An electronic engine control 4 controls the engine 1 through a signal line 5. An electronic transmission control 6 controls the automatic transmission 2 over a signal line 7, and in particular determines a respective gear GE to be engaged.

The transmission control 6 receives information regarding a respectively provided engine torque $M_{mot}$ through a data link 8. An rpm sensor 11 scanning an engine output shaft 10 supplies an engine rpm $n_{mot}$ to the engine control 4 and the transmission control 6 through a signal line 12. The driver controls the transmission 2 through the transmission control 6 and the engine 1 by means of a gas pedal 13. In this case, control signals are transmitted over a signal line 9. A further rpm sensor 15 scanning a transmission output shaft 14 supplies a transmission output rpm $n_{ab}$ to the transmission control 6 over a signal line 16. The transmission output rpm $n_{ab}$ is also a measurement of a vehicle speed v.

Figure 3:
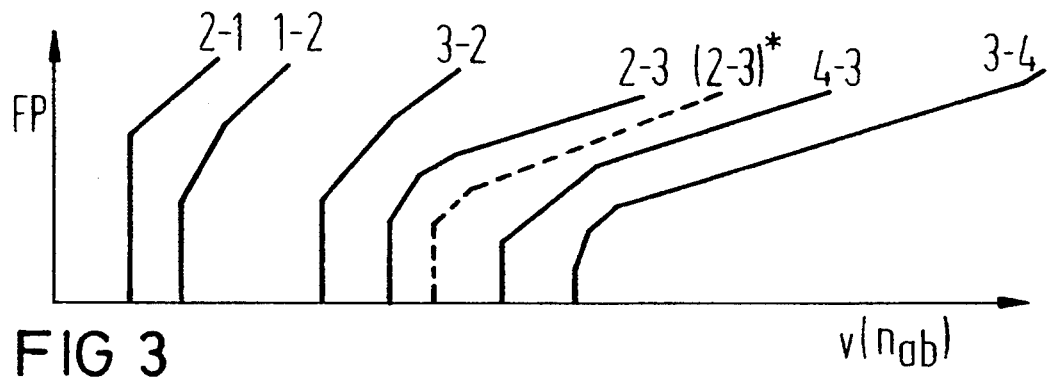
FIG. 3 is a graph showing characteristic shift lines of the transmission control in accordance with FIG. 2.

The transmission control 6 generates shift commands for the transmission 2 with the aid of stored characteristic shift lines, such as is illustrated in the diagram of FIG. 3. The vehicle speed v or the transmission output rpm $n_{ab}$ are plotted on the abcissa of this diagram, and the engine load or the gas pedal position FP corresponding thereto plotted on the ordinate A line with a parameter "3-2" for example, determines at which gas pedal position FP during a given vehicle speed or at which vehicle speed during a given gas pedal position the transmission upshifts from second into third gear. It can be clearly seen that with a more depressed gas pedal FP, i.e. during so-called sporty driving, upshifting and downshifting take place at higher speeds or output rpm.

By switching to a characteristic diagram with characteristic shift lines displaced towards the right, it is possible to achieve higher rpm and thus an increased torque of the transmission output shaft in a given gear rather than in the next higher gear. This is practical on one hand for sporty driving, as well as on the other hand when greater torque is required during driving up an upslope in order to maintain a certain speed. By way of example, a characteristic line (2-3)*, displaced towards the right, i.e. in the direction of increased output, is shown by broken lines in FIG. 3. Of course, all other characteristic lines have been displaced towards the right.

Displacement of the characteristic lines can be manually performed. However, the transmission control described herein recognizes the driving habits of the respective driver and the respective load conditions and automatically adapts the shift points of the transmission to the individual driver on one hand and to the respective load conditions as a function of the upslope of the road or of the vehicle load on the other hand. In addition, it also makes the selective displacement or changing of individual pairs of characteristic shift lines possible. The input values needed by the transmission control are (see also FIG. 1) the vehicle speed v or the output rpm $n_{ab}$ of the transmission, the engaged gear GE and the torque $M_{mot}$ delivered by the engine at that time. As already mentioned, with a sporty driver the transmission will always be in the range of high output rpm of the respective gear, because they correspond to a more depressed gas pedal (larger gas pedal position signal). This is particularly valid during acceleration. This is taken into consideration by the transmission control described herein since it utilizes a temporally detected output rpm value $\bar{n}$ for evaluating the driving style.

Figure 2:
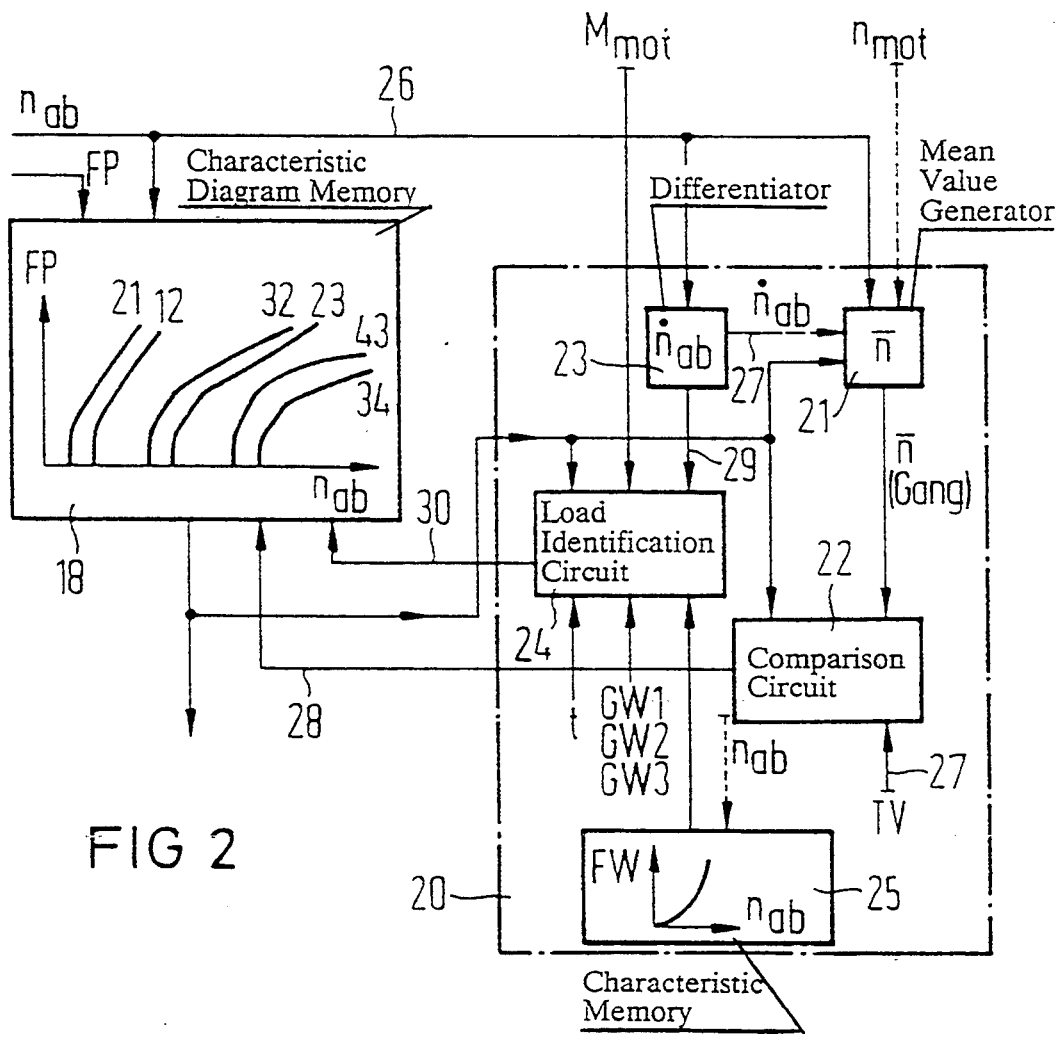
FIG. 2 is a block circuit diagram of a transmission control in accordance with the invention.

A characteristic diagram memory 18 shown in FIG. 2 approximately corresponds to a conventional transmission control which selects the gears by means of the stored characteristic shift lines by determining if characteristic lines are exceeded during acceleration, for example. In this case the characteristic diagram memory 18 is provided with a recognition and control circuit 20. The latter contains a mean value generator 21, a comparison circuit 22, a differentiator 23, a load identification circuit 24 and a characteristic movement resistance line memory 25.

The current values of the output rpm $n_{ab}$ reach the characteristic diagram memory 18, the mean value generator 21 and the differentiator 23, over a line 26. The engine drive rpm are processed in the mean value generator 21 as a function of the gear. In other words, a mean value $\bar{n}$(gear) of $n_{ab}$ is formed during a period of time Dt, each time for one gear. However, it is also possible to determine the mean value $\bar{n}$ from the engine rpm $n_{mot}$ independently of the gear. If the output rpm $n_{ab}$ is scanned more often in the mean value generator 21 in the course of acceleration operations and/or shifting operations and if in this way it weighs it more heavily for calculating the mean value n than outside of these operations, the behavior of the driver is determined even more accurately. This is indicated in the drawings by a line 27, shown as a broken line, over which an acceleration value $n_{ab}$ formed in the differentiator 23 reaches the mean value generator 21 in the form of control information.

In the comparison circuit 22, the gear-dependent rpm mean value $\bar{n}$ (gear) or the gear-independent mean value $\bar{n}$ is compared with a threshold value TV, which is applied over a line 27'. This threshold value TV is preset as either gear-dependent or gear-independent, corresponding to the mean value to be formed. If the mean values $\bar{n}$ (gear) or $\bar{n}$ exceed the preset threshold value, a control signal is generated and transmitted over a line 28 to the characteristic diagram memory 18. Individual characteristic lines or all of the characteristic lines are displaced or changed by means of this signal and shifting conditions adapted to the driving habits of a driver are made available to the driver in this way. Thus the comparison circuit 22 fulfills the function of driver recognition.

If the mean values $\bar{n}$ (gear) or $\bar{n}$ fall below appropriately preset further threshold values, the aforementioned displacement or changing is reversed, i.e. a switch to characteristic lines is made, which causes a shifting operation of the transmission that is optimized for improving consumption.

The signal e,dot $n_{ab}$, which is generated in the differentiator and is proportional to the acceleration of the vehicle, reaches the identification circuit 24 over a line 29 and is checked there to determine if, after a constant speed has been attained, the actual engine torque $M_{mot}$ corresponds to a movement resistance FW on a level surface. A characteristic movement resistance line which is used for this purpose, is stored in the characteristic diagram memory 25 as a function of the output rpm $n_{ab}$.

Once the following three conditions have been cumulatively met:
 a. $M_{mot}$ > threshold value GW1, and
 b. $|n_{ab}|$ < threshold value GW2 for the period DT=1, and
 c. $M_{mot}$ > (eta/ü) × FW ($n_{ab}$) + threshold value GW3 for Dt=1, where eta is the efficiency factor of the transmission and ü is that of the gear, the identification circuit 24 determines that there is a movement resistance different from that of the level surface, for example an upslope. The identification circuit 24 generates a signal which is transmitted over a line 30 to the characteristic diagram memory 18 and there causes a displacement or changing of the characteristic shift lines to shift points where higher engine rpm are available after the shift operation than with characteristic lines which are optimized to improve consumption.

Shifting back to characteristic lines which are optimized to improve consumption takes place if, after the conditions a. and b. have been met, the condition c. is not met. However, in connection with this, such as is generally the case here in connection with shift operations, a different threshold value GW3 and a different period Dt1 is preset in order to obtain a shift hysteresis. The latter prevents continuous up-shifting and down-shifting of the transmission in the course of negligible load changes.

Figure 4:
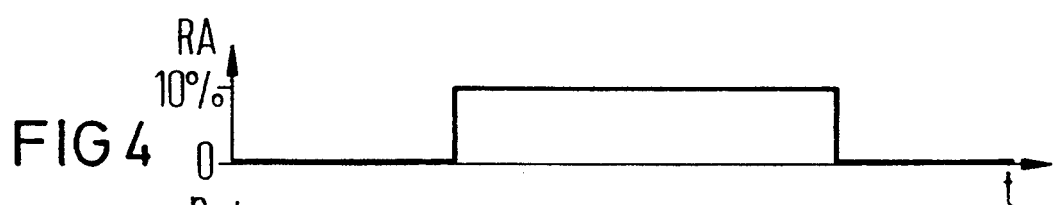
FIGS. 4 to 8 are various graphs used to explain the function of the transmission control in accordance with the invention in connection with level road conditions.
Figure 5:
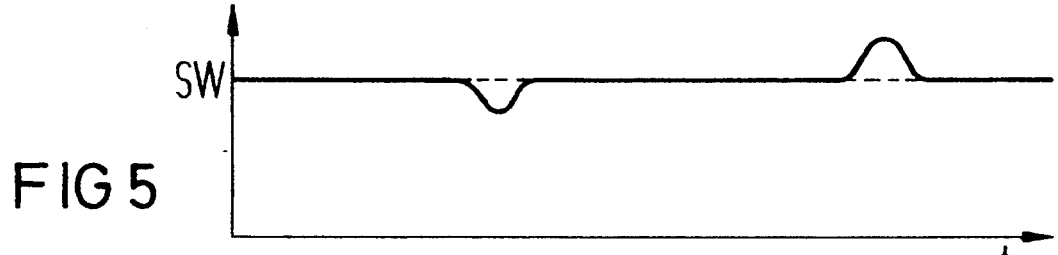
Figure 6:
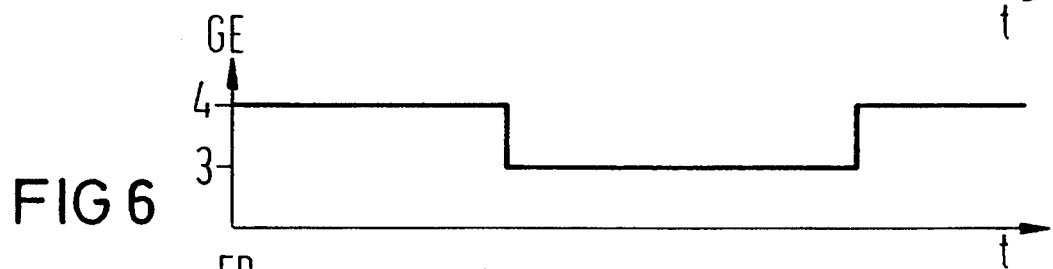

The diagrams of FIGS. 4 to 8 show the connection between a road upslope RA, the output rpm $n_{ab}$, the engaged gear GE, the position of the gas pedal FP and a status AS of the adaptation performed by means of the transmission control. All of the values have been plotted over time t. The driver uses the gas pedal to attempt to set the set value FW of the output rpm $n_{ab}$. The driver presets a set value SW for the speed or the output rpm as seen in FIG. 5. In this case, the actual value (solid line) only shows a deviation from the set value SW during entering or leaving the upslope as seen in FIG. 4. During travel on the upslope, the transmission control makes it possible to bring the set value and the actual value into agreement. The reason for this is that the characteristic shift lines are changed in good time by means of an adaptation and therefore an adapted gear is engaged.

Figure 8:
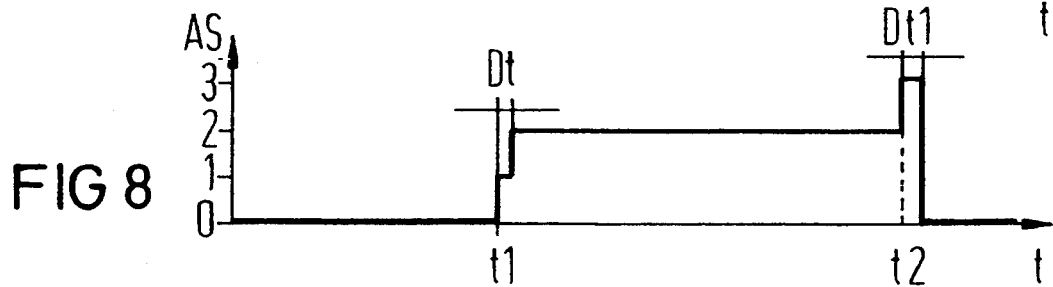
Figure 9:
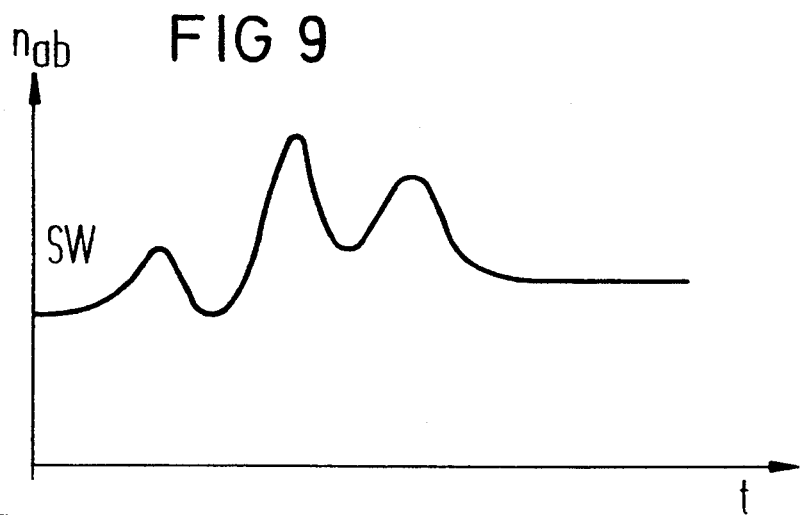
FIGS. 9 to 12 are various graphs used to explain the function of the transmission control in accordance with the invention in connection with driving on an ascending gradient or upslope.
Figure 10:
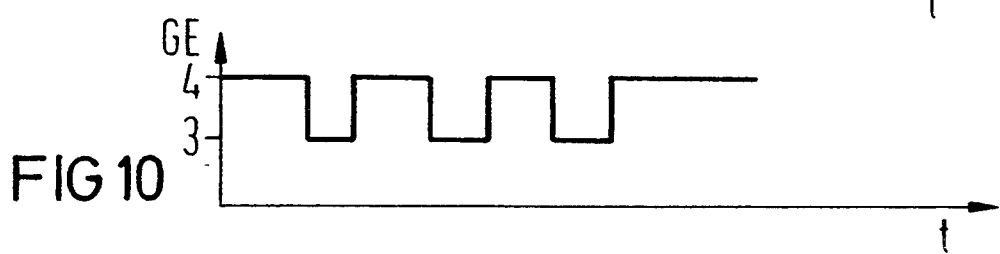
Figure 11:
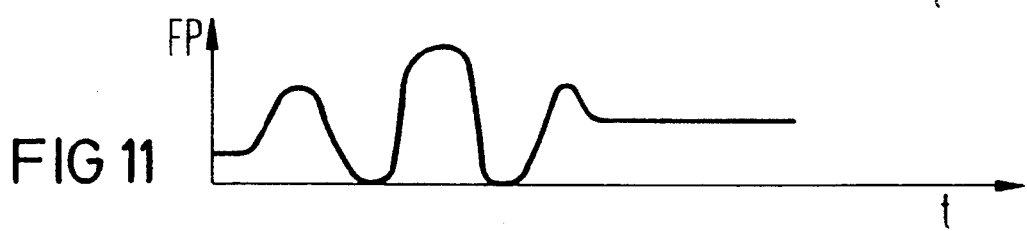
Figure 12:
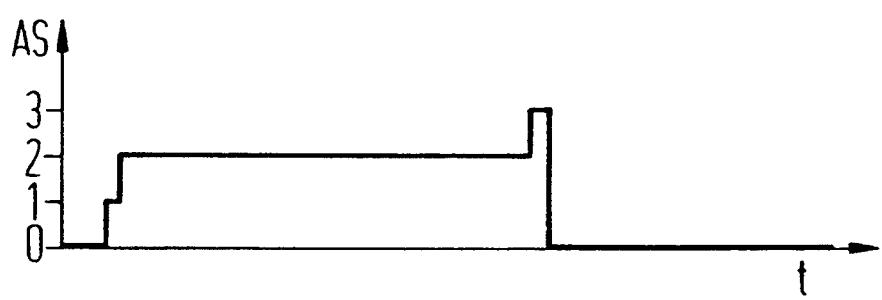

An adaptation status AS=0 exists prior to a time t1 shown in FIG. 8, i.e. characteristic shift lines that are optimized to improve consumption are active. Starting with the time t1, the conditions b. and c. are checked during a period Dt. In this case the condition a. also must be met so that AS=1. Since all of the conditions have been met, the adaptation attains the status AS=2 (changing of the characteristic shift lines). At a time t2, when the vehicle has just left the upslope, the conditions for reversing the adaptation for a time Dt1 are checked during the status AS=3. After the appropriate conditions have been met, the adaptation again reaches the status AS=0.

Figure 7:
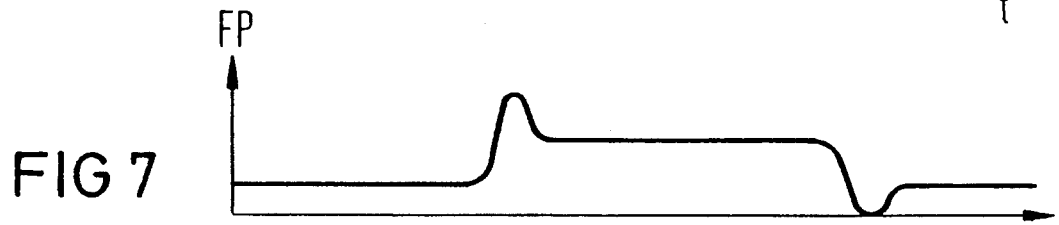

It can be seen that following the changing of the characteristic shift lines (AS=2), the driver finds a constant position with the gas pedal as represented in FIG. 7, in order to maintain the desired speed. There is no "gear hunting" during driving on the upslope.

The diagrams of FIGS. 9 to 12 show the aforementioned values for a vehicle being driven on a level surface, but having an increased load. The course of the set speed SW might correspond to the course of the speed on a route with many curves. If the driver depresses the gas pedal to set a desired set value of the speed or output rpm $n_{ab}$, there is less acceleration of the vehicle than with a normal load. At a time of already increased engine torque there is practically zero acceleration. Thus the conditions a., b. and c. have been met. This has the result that with large acceleration, the characteristic shift lines which are optimized for torque, also set the shift operation when there is an increased vehicle load.

In an exemplary embodiment of the transmission control, the following values have proven practical for the set parameters:

| | | |
|---|---|---|
| Threshold value GW1 | = | 60 Nm |
| Threshold value GW2 | = | 30 rpm/s |
| Threshold value GW3 | = | 45 Nm for activation |
| | = | −10 Nm for deactivation |
| Time period DT1 | = | 250 ms for activation |
| | | 500 ms for deactivation. |

We claim:

1. In a transmission control for a motor vehicle wherein a load acting on the motor vehicle, engine rpm and engine torque are taken into consideration when determining a point for shifting gears, the improvement comprising:
   a circuit having:
      means for determining if an engine torque lies above a first threshold value characterizing a traction operation of a motor vehicle, as a first condition,
      means for determining if an amount of acceleration lies below a second threshold value characterizing unaccelerated drive, as a second condition, and
      means for determining if an engine torque lies above a third threshold value characterizing a movement resistance on a level surface, as a third condition;
   and means for generating a signal when said first, second and third conditions have been met for displacing a point for shifting gears in a direction of increased output rpm, for adapting the point for shifting gears to a driving habit of a driver of the motor vehicle.

2. The transmission control according to claim 1, including a mean value generator for averaging said engine rpm in individual gears.

3. The transmission control according to claim 2, including a comparison circuit having means for comparing said averaged engine rpm with an upper threshold value and means for generating a signal if said upper threshold value is exceeded, for displacing the point for shifting gears in a direction of higher engine drive rpm.

4. The transmission control according to claim 2, including a comparison circuit having means for comparing said averaged engine rpm with a lower threshold value, for displacing the point for shifting gears in a direction of reduced engine drive rpm if said averaged engine rpm falls below said lower threshold value.

5. The transmission control according to claim 1, including a mean value generator for averaging said output rpm in individual gears.

6. The transmission control according to claim 5, including a comparison circuit having means for comparing said averaged output rpm with an upper threshold value and means for generating a signal if said upper threshold value is exceeded, for displacing the point for shifting gears in a direction of higher engine drive rpm.

7. The transmission control according to claim 5, including a comparison circuit having means for comparing said averaged output rpm with a lower threshold value, for displacing the point for shifting gears in a direction of reduced engine drive rpm if said averaged output rpm falls below said lower threshold value.

8. The transmission control according to claim 1, including mean value generator for averaging said engine rpm of all gears.

9. The transmission control according to claim 8, including a comparison circuit having means for comparing said averaged engine rpm with an upper threshold value and means for generating a signal if said upper threshold value is exceeded, for displacing the point for shifting gears in a direction of higher engine drive rpm.

10. The transmission control according to claim 8, including a comparison circuit having means for comparing said averaged engine rpm with a lower threshold value, for displacing the point for shifting gears in a direction of reduced engine drive rpm if said averaged engine rpm falls below said lower threshold value.

11. The transmission control according to claim 1, including a mean value generator for averaging said output rpm of all gears.

12. The transmission control according to claim 11, including a comparison circuit having means for comparing said averaged output rpm with an upper threshold value and means for generating a signal if said upper threshold value is exceeded, for displacing the point for shifting gears in a direction of higher engine drive rpm.

13. The transmission control according to claim 11, including a comparison circuit having means for comparing said averaged output rpm with a lower threshold value, for displacing the point for shifting gears in a direction of reduced engine drive rpm if said averaged output rpm falls below said lower threshold value.

* * * * *